March 3, 1936. J. W. JAMES 2,032,753
FLEXIBLE HOSE GUARD
Filed Jan. 25, 1934
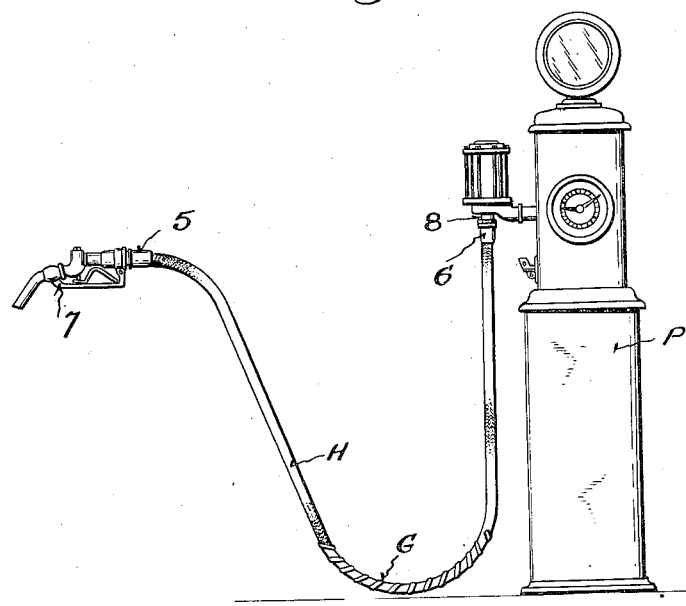
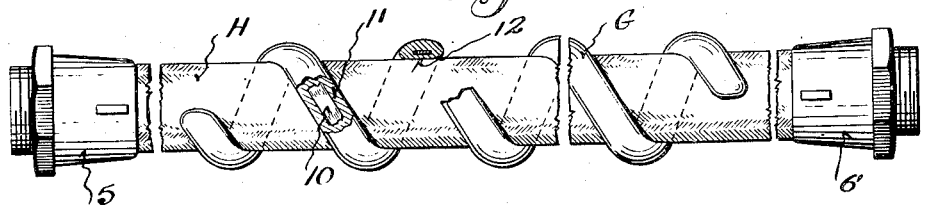
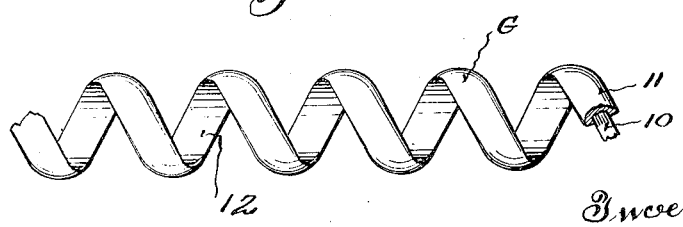
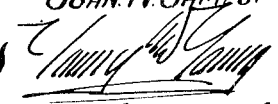
Inventor
John W. James

UNITED STATES PATENT OFFICE 2,032,753

FLEXIBLE HOSE GUARD

John W. James, Chicago, Ill.

Application January 25, 1934, Serial No. 708,283

1 Claim. (Cl. 138—61)

This invention appertains to flexible hose, and more specifically to a novel guard or protector therefor, the guard being susceptible for use with any type of hose, but is particularly adaptable for use on the flexible hoses of gasoline dispensing pumps employed in filling stations, and like places.

It is necessary that the hoses of gasoline dispensing pumps have extreme flexibility, in order that the same can readily follow the contour of the vehicles. Hence, the employance of so-called armored hoses is precluded, and further the armor, if employed, would scratch the finish of the vehicles. To obtain flexibility, the hoses are made of rubber and fabric. The hoses are continually being subjected to a terrific "sandpapering" on the rough surface of the concrete islands, concrete driveways, or in many instances on macadam driveways. The need of extra length hose in crowded service stations and garages aggravates this condition. Many pumps are set under canopies in between rough brick columns, with the hose located on the column side of the pump, causing the hose to scrape the brick each time it is removed or put on its hanger. Also, many hoses are subjected to wear against the sharp rectangular edge of concrete "bull-noses" on the islands. Thus, many hundreds of thousands of feet of hose are ruined annually, necessitating the replacement thereof.

Many attempts have been made to overcome the conditions outlined above, but none to my knowledge has been successful. One proposed type or protector or hose guard consists of a hard rubber ring. These rings do not cover sufficient space, and hence the hose is still subjected to wear. Further, in order to place these rings on the hose, it is necessary to remove the end fittings from the hose. This is a rather complicated procedure, and therefore the rings are not in common use.

It is therefore one of the primary objects of my invention to provide a guard for the hose of gasoline pumps, which can be readily and quickly placed on the hose, at the desired point, without removing the hose end fittings, which will not interfere with the flexibility of the hose, which will not mar the finishes of automobiles, and which will cover a sufficient length of hose to fully protect the same from wear at the abrading points.

Another salient object of my invention is to provide a hose guard or protector in the nature of a spiral spring of the desired length, which can be quickly placed on the hose by placing the first convolution of the spring on the hose, and thereafter threading or turning the spring on the hose until the same is in place, the outer face of the spring being formed of frictional, cushioning material, so that the spring will effectively grip the hose, and thus stay in the desired position on the hose, and so that the spring will not damage the paint on the vehicles being serviced.

A further important object of my invention is the provision of a coil spring protector for hoses, in which the pitch thereof is set, and in which the interior diameter thereof is less than the exterior diameter of the hose with which it is to be associated, whereby the convolutions of the spring will be flexed to permit the same to tightly grip the hose to prevent the spring from creeping on the hose, the formation of the spring being such that the spring can be pulled out or collapsed to different lengths to allow the spring to cover the desired amount of hose surface.

A still further object of my invention is to provide a spiral hose guard of the above character, which will be durable and efficient in use, one that will be simple and easy to manufacture, and one which can be placed upon the market and associated with a conventional hose at a small cost and with the employance of a minimum amount of time.

With these and other objects in view, the invention consists in the novel construction, arrangement, and formation of parts, as will be hereinafter more specifically described, claimed, and illustrated in the accompanying drawing, in which drawing:—

Figure 1 is a side elevation of a gasoline dispensing pump, showing my improved guard applied to the hose thereof.

Figure 2 is a fragmentary side elevation of the hose on a larger scale, showing the guard applied thereto, parts of the guard being shown broken away and in section to illustrate structural details thereof.

Figure 3 is a fragmentary side elevation of the guard removed from the hose.

Referring to the drawing in detail, wherein similar reference characters designate corresponding parts throughout the several views, the letter G generally indicates my improved guard, and H the hose of a gasoline pump P with which the same can be associated.

The pump P and its hose H is of the usual or any preferred character or make, and has been merely illustrated in the drawing to show the use of my novel guard. The hose H can be of the usual rubber and fabric construction, and is provided at its opposite ends with the fittings 5 and 6, which are connected respectively with the dispensing nozzle 7 and the pump outlet 8.

The guard G embodies a flexible steel coil spring 10, preferably made from flat stock. The spring can be made in any diameter, and of any pitch, to fit any size hose. The steel spring 10 is covered with a flexible wear-resisting material 11, which is preferably, but not necessarily, of a high-grade rubber tire stock. Obviously, the guard can be made in various lengths to suit variable conditions.

The spring is so designed as to temper, gauge, etc. that its pitch and shape can be changed sufficiently to allow it to be installed on the hose, or removed from the hose without changing the set of the spring. In other words, it will immediately, on release of the bending pressure required to install or remove it, return to its original shape. The guard also has the characteristics of being able to retain its shape of a perfect circle during a wide range of varying pitches. This allows the guard to cling snugly to the hose surface at any pitch desired within its limits.

The diameter of the guard is preferably less than the outer diameter of the hose with which it is to be associated, thereby preventing shifting thereof on the hose. In view of the character of the steel spring employed, the guard will readily flex with the hose and allow the hose to be used in the ordinary manner. The spring itself can be pulled longitudinally to open the coils of the spring so that the guard itself can be adjusted as to length within certain limits, and thus the guard can be adjusted to protect the desired area of hose. Also, the guard can be collapsed within certain limits by pushing in on the ends of the spring. The resiliency of the spring, and the friction covering 11 thereof, will hold the spring or guard in its adjusted position, and marring of the car being serviced is also prevented.

Where rubber is used to coat the spring, the spring is treated in such a manner that there will be a perfect bond or weld between the rubber and steel when the guard comes from the mould. Not only does this prevent the shifting of the rubber, but it will also prevent any moisture getting to the steel to cause rust, even though the rubber should become worn from the steel at certain spots.

While I have stated that the guard is constructed from a steel spring having an exterior face of cushioning material, it is obvious that the guard can be constructed in different manners. Thus, the entire guard could be made from celluloid, or like material.

One of the important features of my invention is that the inner faces of the convolutions of the guard are provided with inner flat surfaces 12, which give a maximum amount of gripping area on the hose.

It is to be also understood that the guard is capable of being used on other types of hoses than the hoses of gasoline dispensing pumps.

Changes in details may be made without departing from the spirit or scope of this invention, what I claim as new is:—

The combination with a hose having fittings at its ends of a greater diameter than the diameter of the hose, of a flexible guard in the form of a coil for the hose, comprising a rubber body, and a metallic coil spring embedded in said body, the spring and body being of less length than said hose and capable of being threaded on said hose at the desired point between said fittings, the coil spring having a set pitch with the interior diameter less than the exterior diameter of the hose, whereby the convolutions of the guard will tightly grip the hose, and whereby the terminals of the guard will frictionally engage the hose to prevent displacement of the guard from the hose.

JOHN W. JAMES.